US012718804B2

(12) United States Patent
Gopalakrishnan et al.

(10) Patent No.: US 12,718,804 B2
(45) Date of Patent: Aug. 25, 2026

(54) DOMAIN SPECIALTY INSTRUCTION GENERATION FOR TEXT ANALYSIS TASKS

(71) Applicant: Amazon Technologies, Inc., Seattle, WA (US)

(72) Inventors: Karthik Gopalakrishnan, Sunnyvale, CA (US); Sravan Babu Bodapati, Fremont, CA (US); Katrin Kirchhoff, Seattle, WA (US); Sarthak Handa, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 18/356,116

(22) Filed: Jul. 20, 2023

(65) Prior Publication Data

US 2025/0029603 A1 Jan. 23, 2025

(51) Int. Cl.
*G06F 17/00* (2019.01)
*G10L 15/06* (2013.01)
*G10L 15/183* (2013.01)
*G10L 15/22* (2006.01)

(52) U.S. Cl.
CPC .......... *G10L 15/183* (2013.01); *G10L 15/063* (2013.01); *G10L 15/22* (2013.01)

(58) Field of Classification Search
CPC ...... G10L 15/063; G10L 15/183; G10L 15/22
USPC ........................................................ 704/235
See application file for complete search history.

(56) References Cited

U.S. PATENT DOCUMENTS

| | | | |
|---|---|---|---|
| 10,713,593 B2 | 7/2020 | Chen et al. | |
| 2019/0325066 A1* | 10/2019 | Krishna | G06F 16/3347 |
| 2023/0074406 A1 | 3/2023 | Baeuml et al. | |
| 2024/0273291 A1* | 8/2024 | Smith | G06F 16/383 |

OTHER PUBLICATIONS

Long Ouyang, et al., "Training language models to follow instructions with human feedback", Mar. 4, 2022, Retrieved from https://arxiv.org/pdf/2203.02155.pdf, pp. 1-68.

* cited by examiner

*Primary Examiner* — Paul C McCord
(74) *Attorney, Agent, or Firm* — S. Scott Foster; Kowert, Hood, Munyon, Rankin & Goetzel, P.C.

(57) ABSTRACT

Domain specialty instructions may be generated for performing text analysis tasks. An input text may be received for performing a text analysis task. A domain specialty may be identified for the input text. Specialty domain identifiers may be inserted as part of generating instructions to perform the text analysis task using a pre-trained large language model fine-tuned to a domain that includes multiple domain specialties. The pre-trained large language model may perform the text analysis task on the input text using the generated instructions. A result of the text analysis tsk performed on the input text may be provided.

20 Claims, 8 Drawing Sheets

DOMAIN SPECIALTY INSTRUCTION GENERATION FOR TEXT ANALYSIS TASKS

BACKGROUND

Large language models (LLMs) are becoming increasingly capable of performing tasks such as answering questions expressed in natural language, summarizing text and the like. In some cases, however, LLMs may introduce incorrect or nonsensical statements referred to as "hallucinations" in their output. The presence of hallucinations in LLM-generated text can in general lead to lowering end users' trust in LLM capabilities, and is some use cases (e.g., in scenarios in which LLMs are used for health-related applications) may even lead to non-trivial negative impacts (e.g., on health outcomes for health-related applications).

Figure 1:
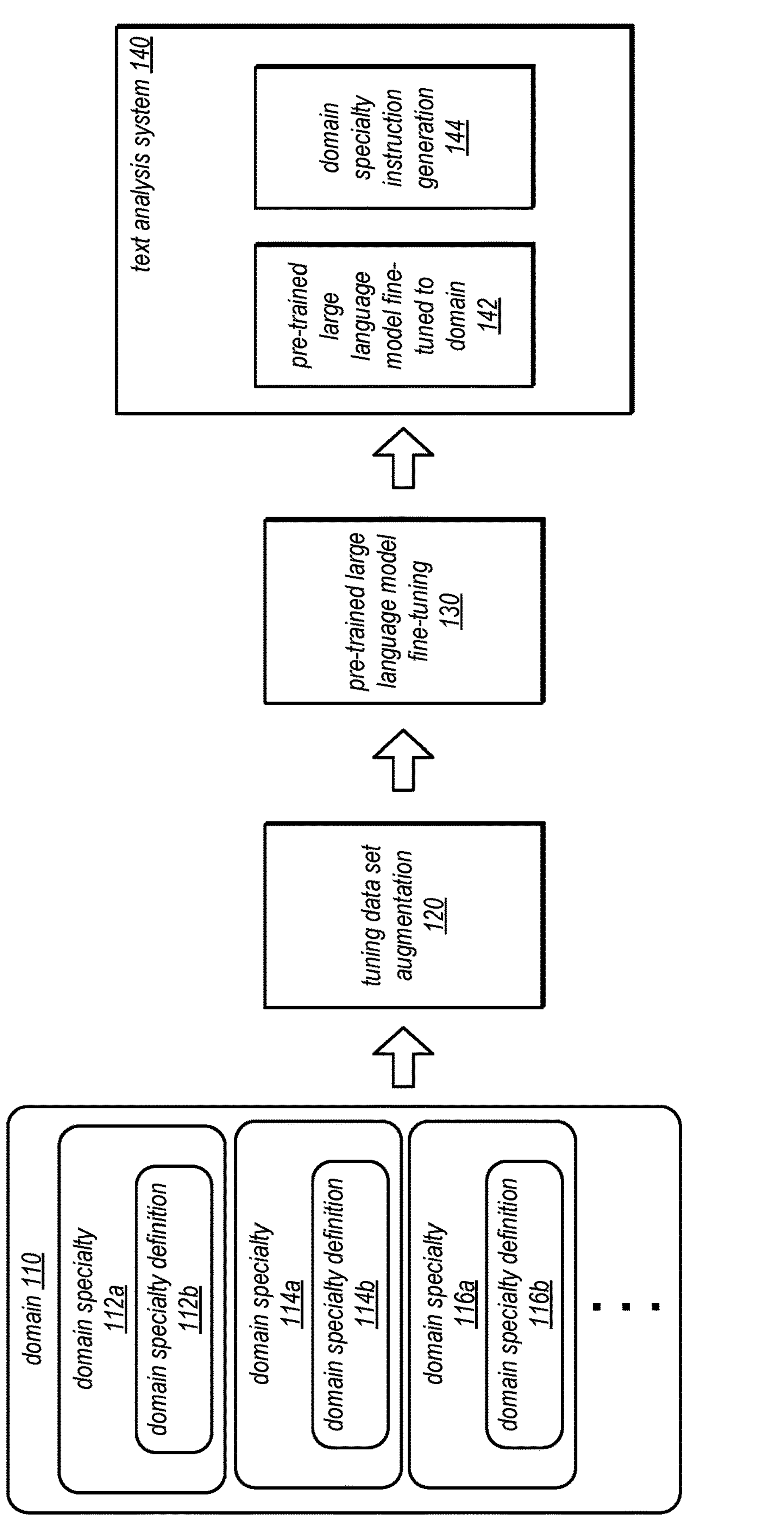
FIG. 1 illustrates a logical block diagram of domain specialty instruction generation for performing text analysis tasks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for domain specialty instruction generation for performing text analysis tasks are described herein. Text analysis tasks may be performed as part of many different natural language or other text processing applications. Text may be obtained, for example, from documents or generated from audio or video transcripts, among other sources. Because these sources may vary across a wide variety of domains (e.g., different branches of knowledge, such as different scientific branches, professional domains (e.g., legal, medical, finance), art, literature, and so on, machine learning models upon which text analysis tasks may rely in order to perform part (or all) of different analysis tasks may encounter esoteric or specialized semantics that may not have been adequately observed in training machine learning models.

For example, text analysis tasks performed in the healthcare domain may include tasks to generate medical summaries of doctor-patient conversations from clinical visits. These summaries may capture a patient's reason for visit, history of illness as well as the doctor's assessment and plan for the patient. The summaries may be created using a special class of machine learning models, generative large language models (LLM) that are tuned to follow natural language instructions describing any task. This class of LLMs (e.g., InstructGPT) are typically trained on massive general-purpose text corpora and on a variety of tasks, including summarization. However, such models may perform poorly on healthcare domain-specific summarization, both without and with additional training on healthcare domain-specific data.

Poor results can occur without adequate training. For instance, such models may emit factually inaccurate content about the symptoms, medications prescribed, the doctor's assessment/plan, etc. While text analysis services may currently be intended to work with a human-in-the-loop in the form of manual inspection/correction by scribes, it is still desirable to minimize factual inaccuracies. Accordingly, for performing text analysis tasks in specific domains (e.g., the healthcare domain) there may be specialty-level containerization of knowledge that can naturally constrain the conversations or text generated by an individual working in a specific domain. For example, an otolaryngologist (a doctor specializing in ear, nose, and throat health) may be unlikely to be talking to a patient about vision symptoms, which fall under the ophthalmology specialty (e.g., for eye health).

Instead of fine-tuning different versions of machine learning models, such as LLMs to perform text analysis tasks for separate domain specialties, in various embodiments techniques for domain specialty instruction generation for performing text analysis tasks may be implemented that train machine learning models to accept and apply domain-specific information as part of input to perform text analysis tasks. In this way, the number of versions of machine learning models can be significantly reduced (e.g., from hundreds of domain-specific models, each corresponding to a different domain, to a single fine-tuned machine learning model that is fine-tuned to handle-domain specific information across a wide variety of domains (or domain specialties within a domain) and use it in performing text analysis tasks. Moreover, such improvements to the use of machine learning models to perform domain-specific text analysis tasks can allow for fast development and deployment of systems, services or applications that utilize domain specific text analysis without costly, time-consuming, and technically challenging domain-specific model training to perform. The development cycle for computer-performed text analysis tasks can be significantly improved as well as the performance of systems, services, or applications that make use of text analysis tasks and other related computer technologies.

FIG. 1 illustrates a logical block diagram of domain specialty instruction generation for performing text analysis tasks, according to some embodiments. Different domains for different areas of text analysis, such as health care as mentioned above and discussed below with regard to FIGS. 2-5 or other areas of specialty text analysis (e.g., legal, scientific disciplines or categories, etc.) may utilize a domain 110. Within a domain there may be various different specialties (e.g., different biology specialties, different journalism specialties, different legal specialties, or different medical specialties), as indicated at by domain specialties 112*a*, 114*a*, 116*a* and so on. Each of these specialties may have respective definitions, such as 112*b*, 114*b*, and 116*b*, which can be used to augment a training data set, as indicated at 120. Domain specialty definitions, such as 112*b*, 114*b*, and 116*b* may be specified by a text analysis task system developer (e.g., to provide custom or context-specific specialties) and submitted as part of a request to create and/or deploy domain specific text analysis systems, or may be obtained from various authoritative sources (e.g., medical specialties can be obtained from American Medical Association or other professional organizations that represent the domain, dictionaries, or various other creditable sources).

As indicated at 120, a data set for tuning a pre-trained large language model may be obtained and augmented using the different domain specialties 112*a*, 114*a*, and 116*a*, along with their respective specialty definitions, 112*b*, 114*b*, and 116*b*. Data set augmentation 120 may label various training examples for text analysis tasks with the respective domain-specialties, in some embodiments. For example, different scientific conference panel transcripts for different biology specialties may each be labeled with the corresponding biology specialty. As indicated at 130, a pre-trained large language model may be fine-tuned using the tuning data set augmentation. As part of the fine-tuning techniques, prompts that include the domain specialty instruction may be included (e.g., similar to those domain specialty prompt instruction generation techniques discussed below with regard to domain specialty instruction generation 144).

Once fine-tuned for domain-specialty instruction, the fine-tuned large language model may be deployed, such as pre-trained large language model fine-tuned to domain-specific instruction 142. This allows a text analysis system 140 that performs text analysis tasks on the different domain specialties (or across multiple domains with multiple domain specialties) to have domain-specialty information used to guide the text analysis to greater factual accuracy. Pre-trained large language model 142 that is fine tuned to the domain can then be used to perform text analysis tasks, such as summarization, using domain specialty instructions that are generated and inserted into prompts or other instructions to perform the text analysis tasks at 144 when requests to perform domain analysis tasks are received at system 140 (e.g., as discussed below with regard to FIG. 3 for performing audio-to-text summaries).

Please note that the previous description of specialty instruction generation for performing text analysis tasks is a logical illustration and thus is not to be construed as limiting as to the implementation of a task analysis system.

This specification continues with a general description of a provider network that implements multiple different services, including a medical audio processing service, which may implement domain specialty instruction generation for performing text analysis tasks. Then various examples of, including different components, or arrangements of components that may be employed as part of implementing the services are discussed. A number of different methods and techniques to implement domain specialty instruction generation for performing text analysis tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
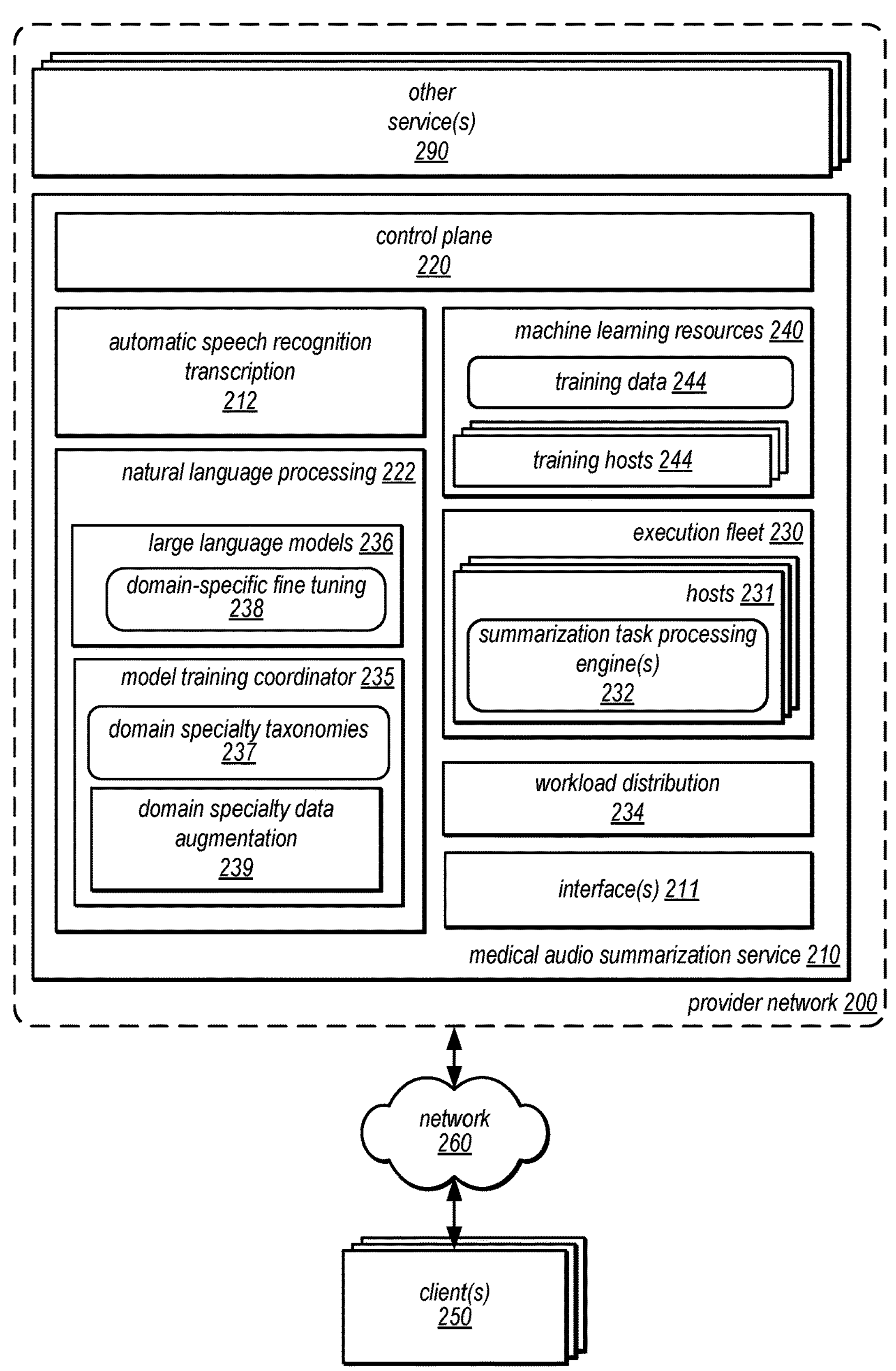
FIG. 2 illustrates an example provider network that may implement natural language processing service that implements domain specialty instruction generation for performing text analysis tasks, according to some embodiments.

FIG. 2 illustrates an example provider network that may implement natural language processing service that implements domain specialty instruction generation for performing text analysis tasks, according to some embodiments. In some embodiments, a provider network 200 may be a private or closed system or may be set up by an entity such as a company or a public sector organization to provide one or more services (such as various types of cloud-based storage or computing services) accessible via the Internet and/or other networks to clients 250, in some embodiments. The provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. For example, the provider network 200 may implement various computing resources or services, such as a medical audio summarization service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the medical audio summarization service 100 may implement interface(s) 211 to allow clients (e.g., client(s) 250 or clients implemented internally within provider network 200, such as a client application hosted on another provider network service like an event driven code execution service or virtual compute service) to interact with the medical audio summarization service 210. The interface(s) 211 may be one or more of graphical user interfaces, programmatic interfaces that implement Application Program Interfaces (APIs) and/or command line interfaces, such as input interfaces, user setting interfaces, output interfaces, and/or output APIs.

In at least some embodiments, summarization task engine (s) 232 may be implemented on hosts 231 to initiate tasks for automatic speech recognition transcription 212 and natural language processing 222. The workload distribution 234, comprising one or more computing devices, may be responsible for selecting the particular host 231 in execution fleet 230 that is to be used to implement a summarization task engine(s) 232 to be used to perform a given job. The medical audio summarization service 210 may implement control plane 220 to perform various control operations to implement the features of medical audio summarization service 210. For example, the control plane 220 may monitor the health and performance of computing resources (e.g., computing system 1000) used to perform tasks to service requests at different components, such as workload distribution 234, hosts 231, machine learning resources 240, automatic speech recognition transcription 212, and natural language processing engine 222. The control plane 220 may, in some embodiments, arbitrate, balance, select, or dispatch requests to different components in various embodiments.

The medical audio summarization service 210 may utilize machine learning resources 240. The machine learning resources 240 may include various frameworks, libraries, applications, or other tools for training or tuning machine learning models utilized as part of medical audio summarization service 210. For example, large language model 236 may be trained or fine-tuned (e.g., with domain-specific fine tuning), as discussed according to the techniques below for FIG. 4.

Generally speaking, clients 250 may encompass any type of client that can submit network-based requests to provider network 200 via network 260, including requests for the medical audio summarization service 210 (e.g., a request to generate a transcript and summary of a medical conversation). For example, a given client 250 may include a suitable version of a web browser, or may include a plug-in module or other type of code module that can execute as an extension to or within an execution environment provided by a web browser.

In some embodiments, a client 250 may provide access to provider network 200 to other applications in a manner that is transparent to those applications. Clients 250 may convey network-based services requests (e.g., requests to interact with services like medical audio summarization service 210) via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between the given client 250 and the Internet as well as between the Internet and provider network 200. It is noted that in some embodiments, clients 250 may communicate with provider network 200 using a private network rather than the public Internet.

In some embodiments, medical audio summarization is performed, such as by a medical audio summarization service 210, and may resemble embodiments as shown in FIG. 2. In some embodiments, an input interface of the medical audio summarization service 210 may receive an indication of a medical conversation to be summarized (with various features, such as making a summary conforming to a user preferred style). In some embodiments, the input interface may receive an audio file including metadata of a medical conversation. For example, the input interface may receive an audio file of a doctor-patient conversation with metadata indicating that the conversation was in the context of a diabetes diagnosis. In some embodiments, a user, such as a physician, may upload a clinical visit audio between a patient and the physician to the input interface in order to generate a transcript and a summary based on the audio. The input interface may provide the audio file to an audio storage and also provide the metadata for the audio file to a metadata managing system. In some embodiments, a user of the medical audio summarization service 210 may indicate the medical conversation is to be summarized according to a preferred style by indicating a stored audio file in the audio storage for the medical audio summarization service 210 to summarize along with an indication of the preferred style. In some embodiments, the indication of the medical conversation to be summarized with the summary conforming to the user preferred summarization style may be a selection of the preferred summarization style from a set of available summarization styles. For example, the user may select as the user preferred style. For example, the style selection may be performed using a dropdown menu of the input interface that displays a list of available summarization styles. In some embodiments, the preferred summarization style may be indicated using a user provided summary sample. For example, the input interface may be configured to allow a user to upload (or otherwise indicate an uploaded one of) a medical conversation summary sample as an indication of the user preferred style. In some embodiments, the input interface may classify the user provided sample as one of a set of available summarization styles, wherein the classified style is used as the user preferred style. In some embodiments, the available summarization styles may be styles that a large language model has been trained to generate. For example, the available summarization styles may be summarization styles that the large language model 236 has been trained to generate. In some embodiments, a user setting interface may receive user preferences and/or user provided training data. For example, a user may indicate one or more summarization preference settings including a preferred style to be used as a default preferred style in the absence of a style selection and/or a user provided summary sample. In some embodiments, a customer may provide a sample medical conversation summary to use as the default preferred style, wherein summaries generated by the medical audio summarization service 210 are generated based on the user provided sample.

In some embodiments, the input interface may receive an indication of a medical conversation to be summarized and generate a job request, requesting a summary be generated for the medical conversation. The medical audio summarization service 210 may send the job request to summarization task processing engine 232. Once summarization task processing engine 232, receives the job request, summarization task processing engine 232 may access the audio file and the metadata of the medical conversation from the audio storage and the metadata managing system, respectively. A control plane 220 may send the job request to be queued to a job queue, in some embodiments. Automatic speech recognition transcription 212 may then process the job request from the job queue and generate a transcript of the medical conversation. For example, automatic speech recognition transcription 212 may be implemented end-to-end automatic speech recognition models based on Connectionist Temporal Classification (CTC) which encode acoustic features from the audio data, generate possible transcriptions, select from among the possible transcriptions using one or more scoring techniques, and then provide as the transcription the selected possible transcription (e.g., decoded from the encoded acoustic features). In some embodiments, the results may be provided cause a results notification. The results notification indicating generation of the transcript may be provided to the task summarization processing engine 232. In some embodiments, a first amount of audio data of the medical conversation may be provided to the automatic speech recognition transcription 212, while the patient and physician are still talking and generating a second (or subsequent) amount of the audio data (e.g., a real-time, live, or streaming scenario for medical audio summarization. For example, the medical conversation may be provided to the automatic speech recognition transcription 212 as an audio input stream. The transcript may be generated based on the first amount of audio data and the automatic speech recognition transcription 212 may receive the second amount of the audio data while continuing to generate the transcript. For example, the transcript may be generated during a clinical visit.

In some embodiments, a summarization task processing engine 232 may receive notification of a job request to generate a summary conforming to a user preferred style selected from a set of available styles (or no style at all). The summarization task processing engine 232 may also receive the transcript needed for the job request via a transcript retrieval interface. Notification of the job request and the transcript may be provided to a control plane 220 (or workload distribution 234) for the summarization task processing engine 232 and the job request and transcript may be provided to a job queue. A summarization task processing engine 232 may be instantiated by the control plane 220 and may receive the job request and the transcript from the job queue. In some embodiments, the summarization task processing engine 232 may then invoke machine learning models such as a medical entity detection model to identify medical entities and a role identification model to identify speaker roles, wherein the medical entity detection model and the role identification model are discretely trained for the specific entity detection/role identification. The workflow processing engine 130 may also invoke the large language model 236 to generate a summary, wherein the large language model takes as inputs outputs generated using the previous models. For example, summary inferences may be generated using the large language model and a transcript that has been marked with medical entities and speaker roles using the medical entity detection model and the role identification model.

In some embodiments, a computing instance instantiated as a summarization task processing engine 232 may access respective ones of the models 236 with domain-specific fine-tuning 238 to perform discrete tasks, such as medical entity detection, role identification, and various summarization tasks, such as sectioning, extraction, and abstraction. The summarization task processing engine 232 may merge results from each task into a current version of the transcript that is being updated as the discrete tasks are performed. The currently updated (and merged) version of the transcript may be used as an input to perform respective ones of the subsequent discrete tasks. For example, in some embodiments, the summarization task processing engine 232 may merge the results from a task performed using a prior model with the transcript and use the merged transcript to determine results for a task that uses the next model. For example, a workflow worker instance of the summarization task processing engine 232 may invoke a medical entity detection model to identify medical entities in a transcript. The results may then be merged with the transcript to include in the original transcript the identified medical entities. The workflow worker instance may then invoke the role identification model to identify speaker roles in the merged transcript. The identified speaker role results may then be merged with the merged transcript to include the identified medical entities and identified speaker roles. In some embodiments, the large language model 236 may generate a summary based on the updated version of the transcript and using domain specialty prompt instructions, as discussed in detail below with regard to FIGS. 3 and 6.

In some embodiments, the respective machine learning models may be used in different orders, but may be trained in whichever order the machine learning models are to be used. For example, in some embodiments, speaker role identification may be performed before medical entity identification, but in such a case, the medical entity identification model may be trained using training data this is output from the speaker role identification task. In other embodiments, medical entity identification may be performed prior to speaker role identification, in which case the speaker role identification model may be trained using training data that is output from the medical entity identification task. In some embodiments, the transcript may be merged with the results of a preceding model before being used for a future model.

In some embodiments, the language model 236 may perform one or more of the discrete tasks discussed above (such as medical entity detection, role identification, etc.) update to the transcript. The large language model 236 may perform multiple ones of a set of discrete tasks, such as sectioning, extraction, and abstraction, as a single script modification task. In some embodiments, the large language model 236 may perform additional ones of the discrete tasks discussed above, such as medical entity detection and role identification, and, in which case, directly use the transcript from the summarization task processing engine 232 to generate the summary.

In some embodiments, a model training coordinator 235 may be used for training the machine learning models with labeled training data, such as annotated transcripts. The model training coordinator 235 may use summarization style labeled training data 244 that comprise previously provided summaries and summary interaction metadata to train the large language model 236. Training of the large language model 236 is further discussed in detail in regard to FIG. 7, which may utilize different domain specialty taxonomies 237 (which may represent or describe different specialties and/or sub-specialties in a domain) for use in augmenting and/or fine-tuning a large language model 236. In some embodiments, the model training coordinator 242 may be used offline.

Once the summary is generated, the summarization task processing engine 232 may provide the generated summary to an output interface. The output interface may notify the customer of the completed job request. In some embodiments, the output interface may provide a notification of a completed job to the output API. In some embodiments, the output API may be implemented to provide the summary for upload to an electronic health record (EHR) or may push the summary out to an electronic health record (EHR), in response to a notification of a completed job.

Figure 3:
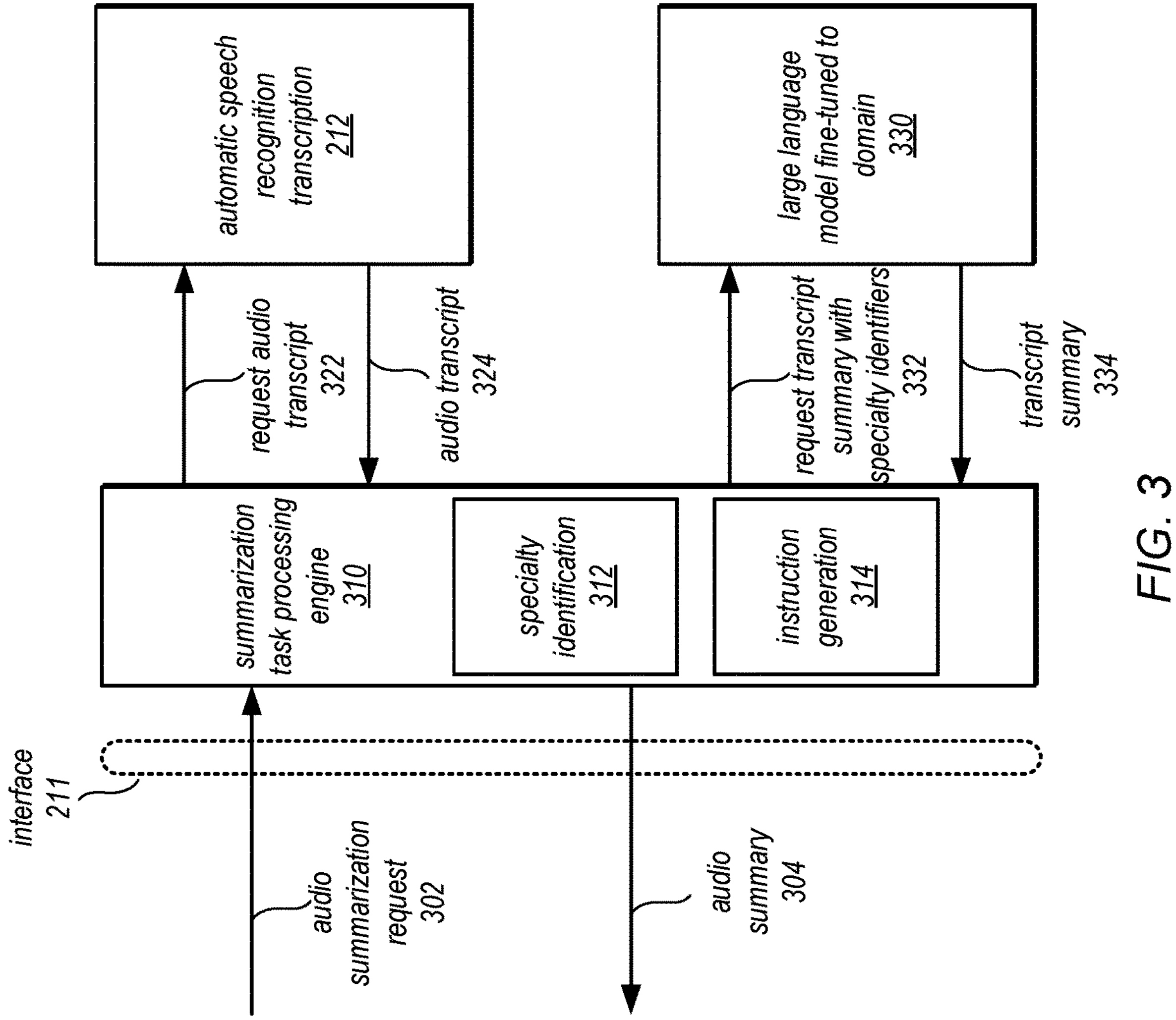
FIG. 3 illustrates a logical block diagram of different interactions to perform text summarizations according to some embodiments using domain specialty instruction generation, according to some embodiments.

FIG. 3 illustrates a logical block diagram of different interactions to perform text summarizations according to some embodiments using domain specialty instruction generation, according to some embodiments. Summarization task processing engine 310 may receive requests via interface 211 (and workload distribution 234) for handling an audio summarization request 302. Audio summarization request 302 may request a specific domain specialty as part of the request. In some embodiments, the request may not include a domain specialty as part of the request. Summarization task processing engine may request audio 322 from automatic speech recognition transcription 212, in some embodiments. Automatic speech recognition transcription 212 may utilize various audio processing techniques, such as deep neural network based speech recognition models to generate an audio transcript of the audio data and provide the audio transcript 324 to summarization task processing engine 310.

Summarization task processing engine 310 may implement specialty identification 312. Specialty identification 312 may identify a domain specialty that is specified in audio summarization request 302 or perform entity recognition (e.g., parsing words from the audio transcript and performing entity classification using similarity indexes, machine learning models, or applying other techniques on the words from the transcript) to identify the domain specialty for the summarization request. For example, a domain may be structured as a graph with different specialties represented in different portions of a graph (which may include sub-specialties of specialties) or other data structure to represent a taxonomy of a domain which can be searched to identify the specialty. Instruction generation 314 may generate and include domain specialty identifiers in the instructions to perform text summarization (e.g., as exemplified in the discussion of FIG. 5 below). Summarization task processing engine 310 may request 332 transcript summary with the specialty identifiers from large language model that is fine-tuned to the domain 330, in some embodiments. The generated transcript summary 334 may be returned and included in audio summary response 304.

Figure 4:
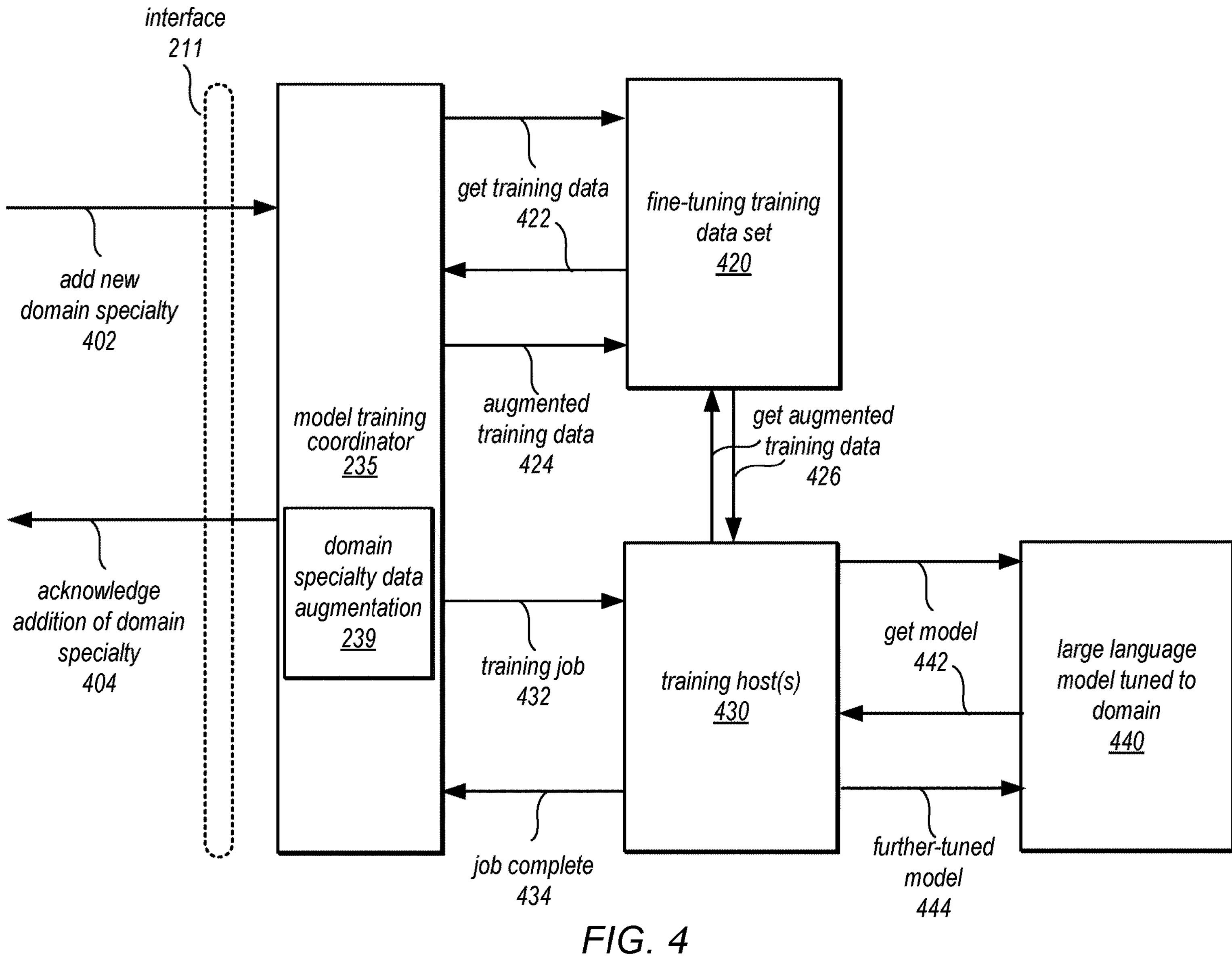
FIG. 4 illustrates a logical block diagram of fine-tuning a pre-trained large language model for performing text summarizations using domain specialty instructions, according to some embodiments.

FIG. 4 illustrates a logical block diagram of fine-tuning a pre-trained large language model for performing text summarizations using domain specialty instructions, according to some embodiments. A request to add a new domain specialty 402 may be received via interface 211 and directed to model training coordinator 235. The request may include a definition of the new domain specialty to add. Model training coordinator 235 may get 422 the training data from fine-tuning data set 420 and apply domain specialty data augmentation 239 to identify and add specialty identifiers for the new domain specialty according to the definition. For example, a Named Entity Recognition (NER) model may be used to recognize entities, terms or other text in fine-tuning training data set that are common to the new domain specialty (e.g., using terms taken from a specialty definition for the new domain specialty). The augmented training data 424 may then be stored.

Model training coordinator 432 may then send a training job to training host(s) 430, which may execute the training job that fine-tunes the large language model tuned to the domain 440, by getting the model 442 and getting the augmented training data 426, executing a fine-tuning technique at training hosts 430. As discussed above, such tuning techniques may include generating instructions to perform text analysis task(s), such as text summarization, as well as including generated domain specialty instructions to include with the instructions. When fine-tuning is complete, the training host(s) 430 may store the further-tuned model 444 and provide an indication that the training job is complete 434 to model training coordinator 235. Model training coordinator 235 may then acknowledge the addition of the domain specialty, as indicated at 404.

Figure 5:
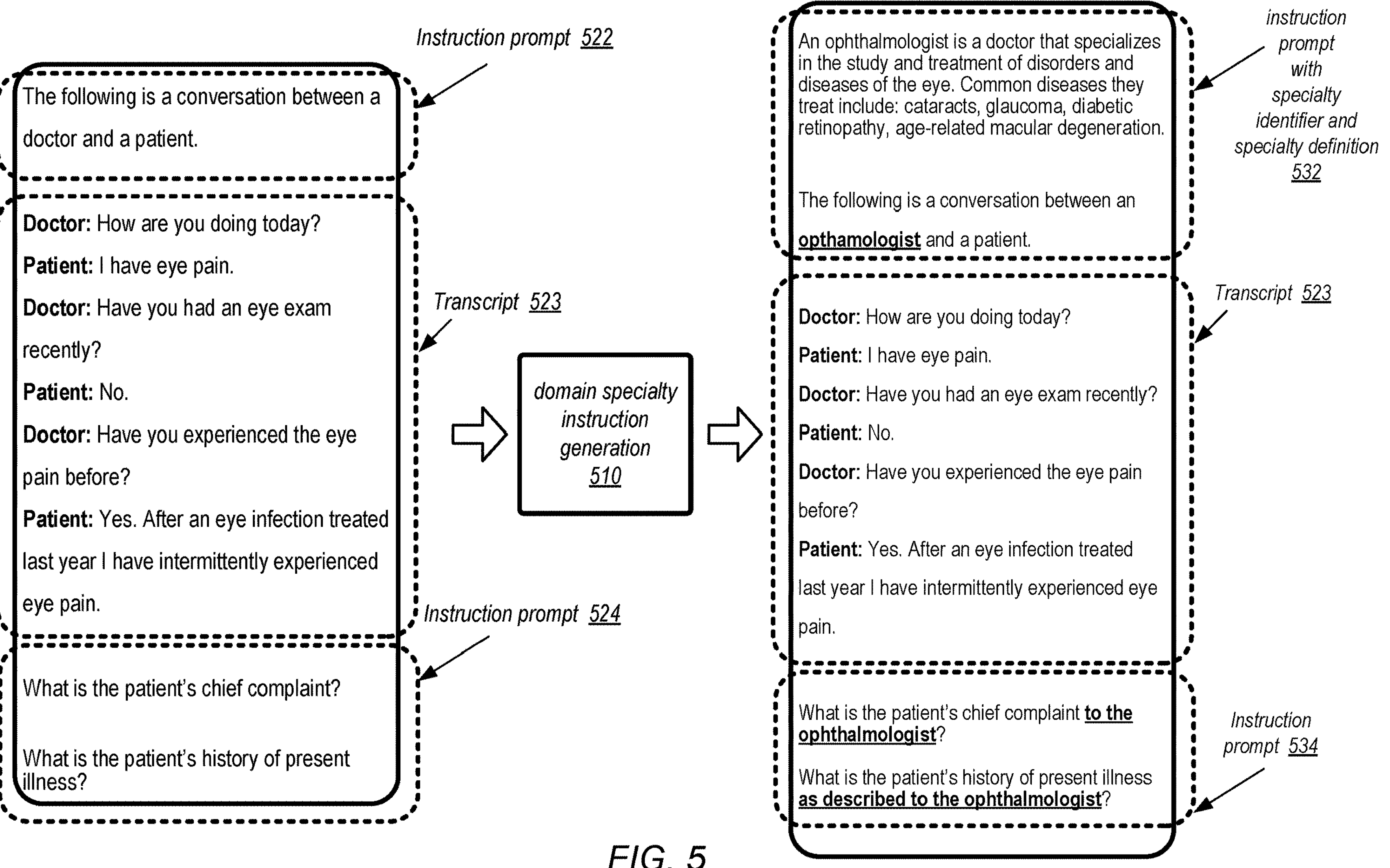
FIG. 5 illustrates a logical block diagram of domain specialty instructions included in summarization task instructions for a large language model, according to some embodiments.

FIG. 5 illustrates a logical block diagram of domain specialty instructions included in summarization task instructions for a large language model, according to some embodiments. Domain specialty instruction generation 510 may take a given transcript 523 with domain generic features (e.g., doctor and patient as exemplified in domain general instruction prompts 522 and 524) and insert, replace, or otherwise include domain specialty identifiers, as indicated at 532 and 534 (e.g., the "ophthalmologist"). In some embodiments, a definition of the domain specialty may be included too, as indicated at 532.

Although FIGS. 2-5 have been described and illustrated in the context of a provider network implementing a medical audio summarization service, the various components illustrated and described in FIGS. 2-5 may be easily applied to other systems that implement text analysis tasks, either standalone systems or implemented as a feature of a larger application. For example, other services that receive text from an external system or source (e.g., a client document) may perform various text analysis tasks, including but not limited text summarization, question answering, drafting additional text, such as introductions or conclusions, performing comparisons between multiple texts, and text translation. As such, FIGS. 2-5 are not intended to be limiting as to other embodiments of domain specialty instruction generation for performing text analysis tasks.

Figure 6:
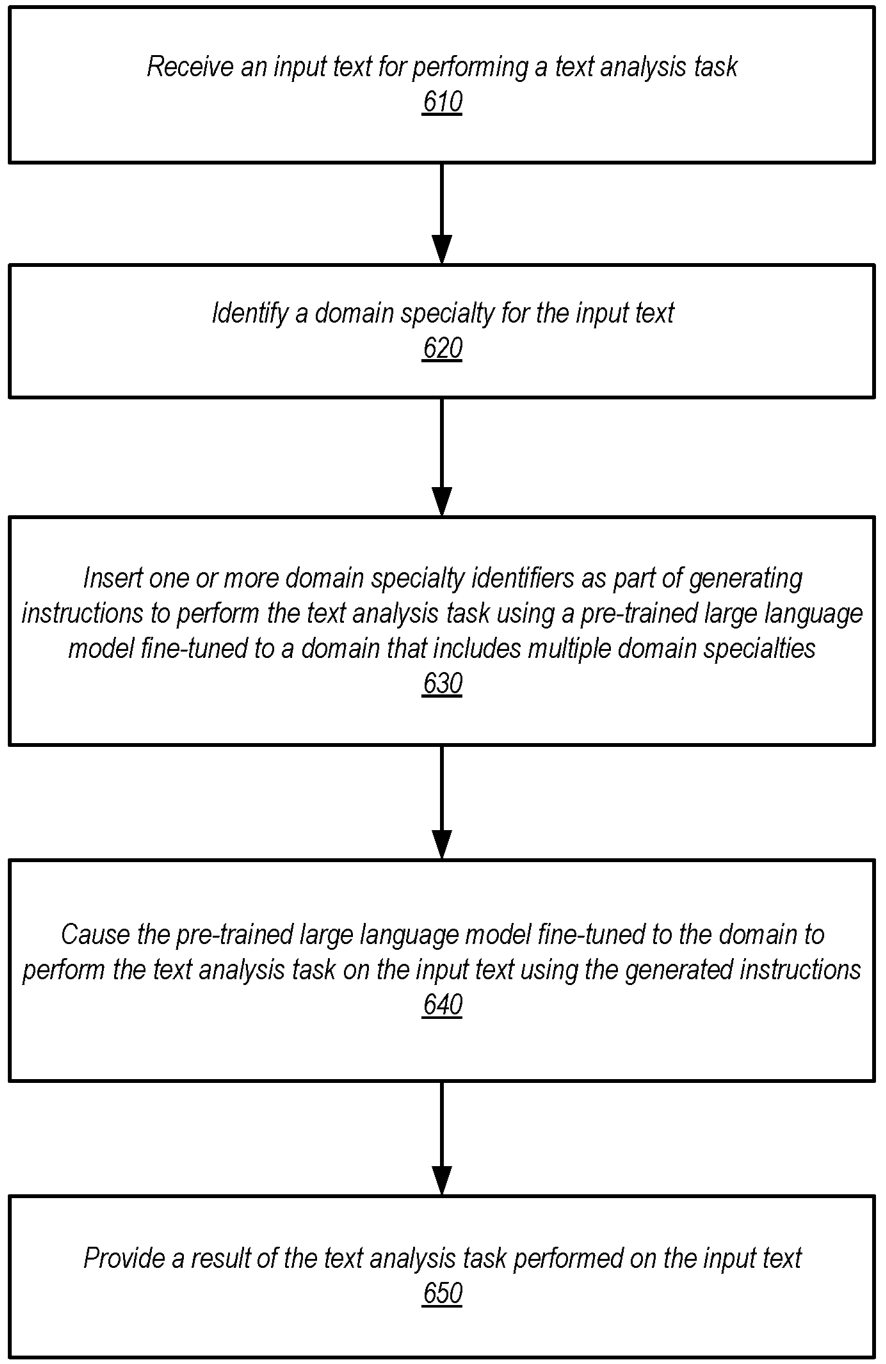
FIG. 6 illustrates a high-level flowchart of various methods and techniques to implement domain specialty instruction generation for performing text analysis tasks, according to some embodiments.

FIG. 6 illustrates a high-level flowchart of various methods and techniques to implement domain specialty instruction generation for performing text analysis tasks, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, an input text for performing a text analysis task may be received, in some embodiments. The input text may be received from a variety of sources. For example, the input text may be received from another system, such an automatic speech recognition system that captured or transcribed the text from audio or video sources. In some embodiments, the text may be captured from image data featuring text upon which optical character recognition techniques are performed to generate text or various types of documents, both human readable documents or documents written according to a file format or schema such as Javascript Object Notation (JSON). In some embodiments, the text may be received as part of a request to perform a text analysis task (or multiple text analysis tasks). In some embodiments, the text may received as part of a batch text that is operated upon in batch processing fashion (e.g., batch processing of multiple text files for performing the same text analysis task). In some embodiments, text may be received as part of a real-time text analysis job or scenario (e.g., for real-time transcription and summarization).

As indicated at 620, a domain specialty for the input text may be identified, in some embodiments. For example, as discussed above, the input text may be parsed, tokenized, transformed into a feature vector or other representation which may be input to a classification system (e.g., using machine-learning models) or a similarity search (e.g., using a similarity index or other search technique that evaluates possible domain specialties) to identify the domain-specialty. In some embodiments, other features (in addition to or instead of the text) may be considered. For example, the source, such as the user account or other identifiers of a client that submitted the text may be used to identify the domain specialty. In some embodiments, the domain specialty may be specified in a request to perform the text analysis task that is received at the text analysis system.

As indicated at 630, one or more domain specialty identifiers may be inserted as part of generating instructions to perform the text analysis task using a pre-trained large language model fine-tuned to a domain that includes multiple domain specialties, in some embodiments. For example, domain general entities may be identified (e.g., by scanning, parsing, or otherwise searching the text using regular expression searches, NER-based searches, or other entity searches) in the input text. The domain general entities may then be replaced or modified to include the specialty identifier (e.g., "doctor" to "pediatrician" or "biologist" to "biologist specializing in marine life"). In some embodiments, domain specialty identifiers may be included in the input text itself or may be added in the instructions alone. In some embodiments, a definition of the domain specialty may be included in the instructions.

As indicated at 640, the pre-trained large language model fine-tuned to the domain may be caused to perform the text analysis task on the input text using the generated instructions, in some embodiments. For example, an API call, interface command, instruction, or other trigger to perform the text analysis task using the inserted domain specialty identifiers in the generated instructions may be used to invoke a host system for the pre-trained large language model to perform the text analysis. In some embodiments, the pre-trained large language model may be local (e.g., on the same host as the other features of an application, system, or service performing the text analysis task) or located remote on another system accessed over a network connection.

As indicated at 650, a result of the text analysis task performed on the input text may be provided, in some embodiments. For example, an interface may display the result, or the result may be stored in a specified location, or the result may be passed to another system for further downstream processing or operations (e.g., text-to-speech operations to playback the summary in speech).

Figure 7:
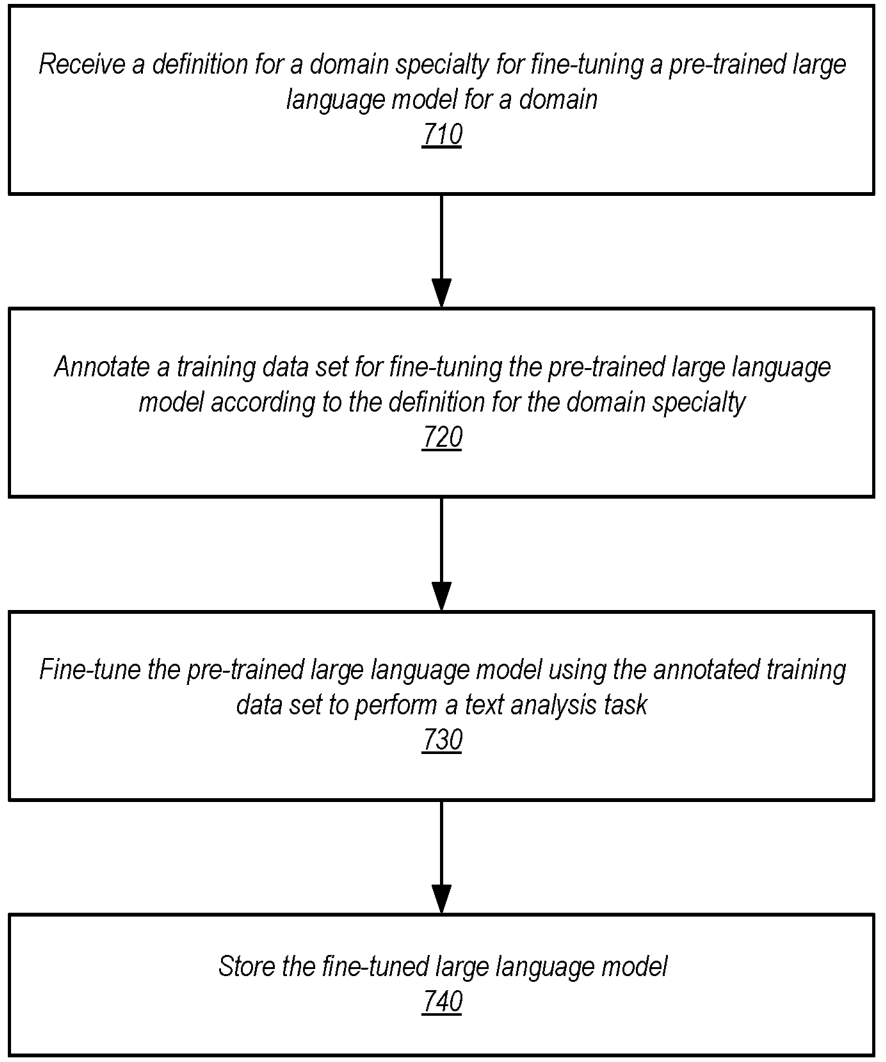
FIG. 7 illustrates a high-level flowchart of various methods and techniques to implement fine-tuning a pre-trained large language model for a domain specialty when performing a text analysis task, according to some embodiments.

FIG. 7 illustrates a high-level flowchart of various methods and techniques to implement fine-tuning a pre-trained large language model for a domain specialty when performing a text analysis task, according to some embodiments. As indicated at 710, a definition for a domain specialty for fine-tuning a pre-trained large language model for a domain may be received, in some embodiments. For example, the definition may be received as part of a request to add a new domain specialty to a pre-trained large language model. In some embodiments, the definition may be one of a batch or collection of definitions for multiple domain specialties.

As indicated at 720, a training data set for fine-tuning the pre-trained large language model according to the definition for the domain specialty, in some embodiments. As discussed above, training data may be augmented in order to incorporate domain specialty labels for performing fine-tuning. For instance, each training example may be evaluated using a domain specialty definition to determine whether to label that example with the domain specialty (e.g., using classifiers or other automated techniques, or the labeled data set may be provided by the provider of the domain specialty definitions to be added).

As indicated at 730, the pre-trained large language model may be fine-tuned using the annotated training data set to perform a text analysis task, in some embodiments. For example, tuning techniques may include generating instructions to perform text analysis task(s), such as text summarization, as well as including generated domain specialty instructions to include with the instructions. As indicated at 740, the fine-tuned large language model may be stored, in some embodiments. For example, a model store may be maintained that is used to maintain different fine-tuned models for different use cases (e.g., different text analysis tasks or domains). These fine-tuned models can then be retrieved and deployed for different text analysis systems from storage.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
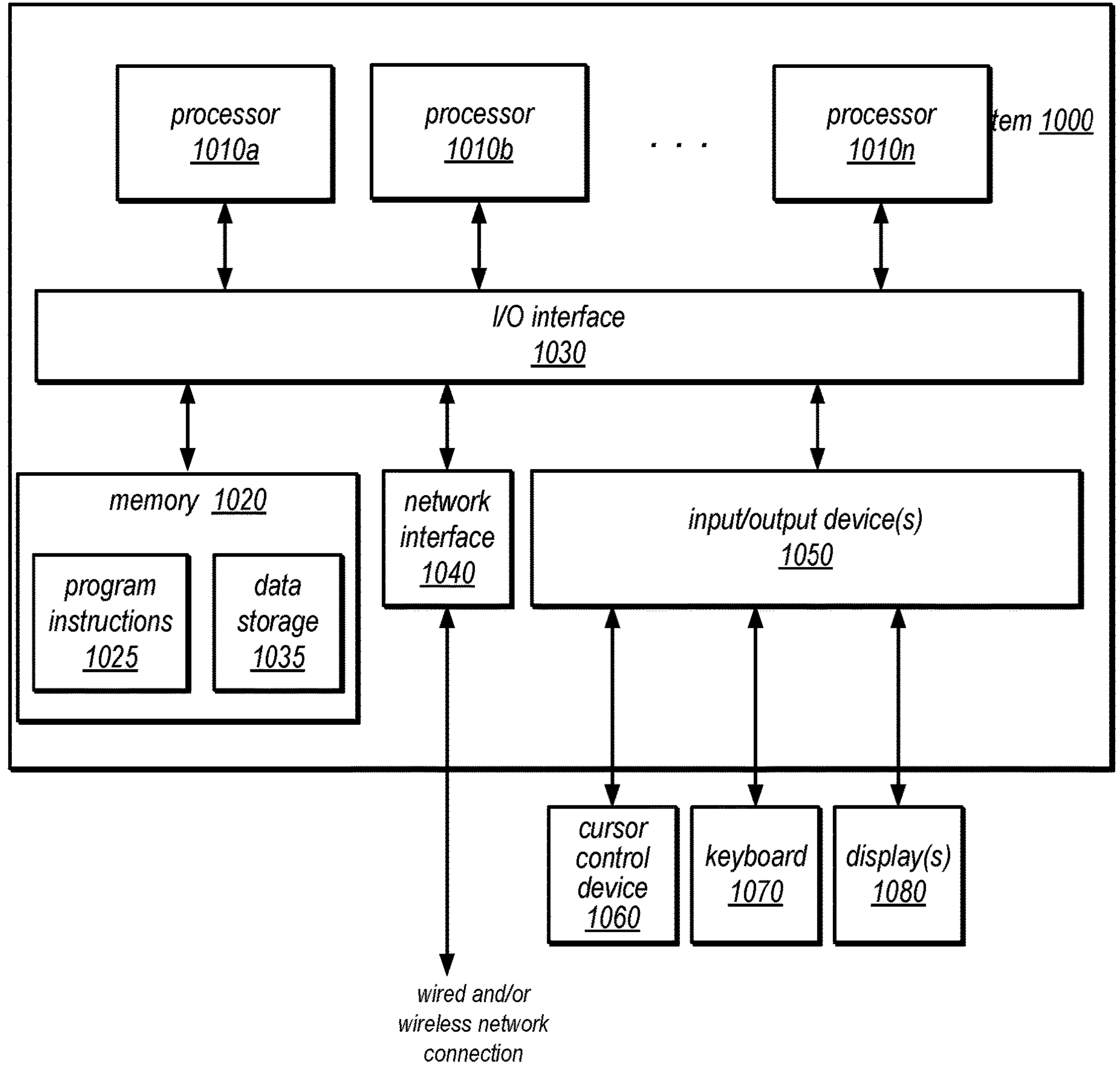
FIG. 8 illustrates an example system to implement the various methods, techniques, and systems described herein, according to some embodiments.

Embodiments of domain specialty instruction generation for performing text analysis tasks as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more computing devices, respectively comprising at least one processor and a memory;

wherein the one or more computing devices store program instructions that when executed by the one or more computing devices:

receive a request to perform a summarization task on a natural language text, wherein the request specifies a domain specialty;

insert one or more domain specialty identifiers as part of generating instructions to perform the summarization task to replace a general identifier specific to a domain on which a pre-trained large language model has been further trained using a plurality of domain specialties, including the domain specialty, of the domain;

cause the pre-trained large language model further trained using the plurality of domain specialties of the domain to perform the summarization task on the natural language text using the generated instructions; and provide a result of the summarization task performed on the natural language text.

2. The system of claim 1, wherein the one or more computing devices store further program instructions that when executed by the one or more computing devices insert a definition of the domain specialty as part of generating the instructions to perform the summarization task using the pre-trained large language model further trained using the plurality of domain specialties of the domain.

3. The system of claim 1, wherein the one or more computing devices store further program instructions that when executed by the one or more computing devices generate the natural language text as a transcript from obtained audio data using an automatic speech recognition system.

4. The system of claim 1, wherein the one or more computing devices are implemented as part of a medical audio summarization service offered as part of a provider network and wherein the request is receive via an interface of the medical audio summarization service.

5. A method, comprising:

receiving, at a text analysis system, an input text for performing a text analysis task;

identifying, by the text analysis system, a domain specialty for the input text;

inserting, by the text analysis system, one or more domain specialty identifiers as part of generating instructions to perform the text analysis task to replace a general identifier specific to a domain on which a pre-trained large language model has been further trained using a plurality of domain specialties, including the domain specialty, of the domain;

causing, by the text analysis system, the pre-trained large language model further trained using the plurality of domain specialties of the domain to perform the text analysis task on the input text using the generated instructions; and providing, by the text analysis system, a result of the text analysis task performed on the input text.

6. The method of claim 5, further comprising inserting, by the text analysis system, a definition of the domain specialty as part of generating the instructions to perform the text analysis task using the pre-trained large language model further trained using the plurality of domain specialties of the domain.

7. The method of claim 5, wherein the text analysis system supports a plurality of different domains, including the domain, and wherein the domain is specified as part of a request to perform the text analysis task.

8. The method of claim 5, wherein the text analysis task is a summarization task.

9. The method of claim 5, further comprising generating the input text as a transcript from obtained audio data using an automatic speech recognition system.

10. The method of claim 5, further comprising:

receiving a request to add a new specialty to the domain, wherein the request includes a definition for the new specialty; and performing additional training on the pre-trained large language model for the domain using additional training data annotated with specialty identifiers for the new specialty.

11. The method of claim 5, wherein the domain specialty is identified for a plurality of different texts, including the input text, as part of performing batch processing of the text analysis task on the plurality of different texts.

12. The method of claim 5, wherein identifying the domain specialty for the input text comprises performing an entity recognition technique on the input text.

13. The method of claim 5, wherein identifying the domain specialty for the input text comprises identifying the domain specialty as specified in a request to perform the text analysis task.

14. One or more non-transitory, computer-readable storage media, storing program instructions that when executed on or across one or more computing devices cause the one or more computing devices to implement: receiving an input text for performing a text analysis task; identifying a domain specialty for the input text; inserting one or more domain specialty identifiers as part of generating instructions to perform the text analysis task to replace a general identifier specific to a domain on which a pre-trained large language model has been further trained comprising using a plurality of domain specialties, including the domain specialty, of the domain; causing the pre-trained large language model the domain to perform the text analysis task on the input text using the generated instructions; and providing a result of the text analysis task performed on the input text.

15. The one or more non-transitory, computer-readable storage media of claim 14, storing further program instructions that when executed by the one or more computing devices, cause the one or more computing devices to further implement inserting a definition of the domain specialty as part of generating the instructions to perform the text analysis task using the pre-trained large language model further trained using the plurality of domain specialties of the domain.

16. The one or more non-transitory, computer-readable storage media of claim 14, storing further program instructions that when executed by the one or more computing devices, cause the one or more computing devices to further implement generating the input text as a transcript from obtained audio data using an automatic speech recognition system.

17. The one or more non-transitory, computer-readable storage media of claim 14, wherein the domain specialty is identified for a plurality of different texts, including the input text, as part of performing batch processing of the text analysis task on the plurality of different texts.

18. The one or more non-transitory, computer-readable storage media of claim 14, wherein, in identifying the domain specialty for the input text, the program instructions cause the one or more computing devices to implement performing an entity recognition technique on the input text.

19. The one or more non-transitory, computer-readable storage media of claim 14, wherein, in identifying the domain specialty for the input text, the program instructions cause the one or more computing devices to implement identifying the domain specialty as specified in a request to perform the text analysis task.

20. The one or more non-transitory, computer-readable storage media of claim 14, wherein the one or more computing devices are implemented as part of a medical audio summarization service offered as part of a provider network and wherein the input text is receive via an interface of the medical audio summarization service.

* * * * *